No. 779,887. PATENTED JAN. 10, 1905.
G. H. STEWART.
SHEET METAL PLATE.
APPLICATION FILED AUG. 10, 1904.

ATTEST:
O S Middleton
Edward Sartow

INVENTOR.
GEORGE H. STEWART.

by Spear, Middleton, Donaldson & Spear
Att'ys

No. 779,887. Patented January 10, 1905.

UNITED STATES PATENT OFFICE.

GEORGE H. STEWART, OF LOS ANGELES, CALIFORNIA.

SHEET-METAL PLATE.

SPECIFICATION forming part of Letters Patent No. 779,887, dated January 10, 1905.

Application filed August 10, 1904. Serial No. 220,265.

*To all whom it may concern:*

Be it known that I, GEORGE H. STEWART, a citizen of the United States, residing at Los Angeles, California, have invented certain new and useful Improvements in Sheet-Metal Plates, of which the following is a specification.

My invention relates to that class of sheet metals used principally in the manufacture of cans and like receptacles for hermetically sealing the contents. In the manufacture of such cans and receptacles as heretofore made the solder must be applied accurately to the seam in the process of soldering and then "sweated" between the parts. This requires machinery, complicates the process, and involves constant liability to imperfections in the cans. A material percentage of the cans produced by machinery (and almost all cans are so made) is imperfect, and this involves a waste of material and labor. I have proposed to eliminate altogether the application of the solder as a step or part in the manufacture of such vessels by so coating or covering the sheet metal that the coat or covering will contain the elements of the solder, and these elements being in place between the parts lapped or in contact fuse upon the application of heat and form the solder and unite the parts at once and throughout the region of contact.

I have illustrated my invention by the accompanying drawings, in which—

Figure 1:
Figure 2:
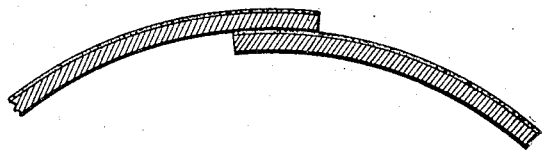

Figure 1 represents the edge of an ordinary tin-plate with a coating (as lead, for example) on one side and tin on the other. Fig. 2 shows the same lapped.

In the simplest form of my invention I take the ordinary tin-plate of commerce—that is to say, the steel sheets coated on both sides with tin in the ordinary way—and add thereto on one side a coating of lead. The lead applied is such in amount that when the leaded surface at one edge is lapped upon the tinned surface at the opposite edge the materials of those surfaces shall when melted fuse into a solder and unite the parts. Obviously the sheet of which the receptacle is formed being coated with lead on one side and tin on the other will when lapped bring invariably lead surface upon tin surface. This renders unnecessary the extraneous application of solder and eliminates from the can-making machinery all solder-applying devices, with their attending liability to defects in the seams due to imperfect distribution of the solder therein, and, further, avoids waste of solder and defects in the receptacle or its joints. Manifestly the heat may be applied in any of the well-known ways or in any way to these seams to form the joint. It will be perceived that the elements or constituents of the solder are in place in the seam particle opposite particle at every point and each in union with its own sheet or surface, with ample reinforcement of solder-forming material adjacent to the seam at every point. All, therefore, that is necessary is that the elements of the two parts should be fused to form the solder which when cooled unites the parts. Whatever flux may be needed I apply to the surfaces or may even combine it with the coating.

As a modification I locate the lead and tin or other elements which form the coating on one side of the sheet as a subjacent coating, and this alone when fused at the time of soldering or previously thereto forms the solder. The effect may be produced in accordance with my invention by adding a coating of one or more of the elements or constituents of the solder to the blank at those points only where it is desired to form the solder.

The complete coating of the surface of the plate or blank with one or more of solder-forming elements adapted to unite with other element or elements when lapped and heated has this advantage that the solder is in proper place on the blank in whatever size or shape the blank may be cut, and there is a further advantage that the solder-forming element—such as lead, for example—may be on the outside of the receptacle and form thereon a coating better adapted than any other protective coating in use to resist corrosion in storage or transportation. This effect is obtained if the exterior surface contain all the elements of the solder.

I claim—

1. A sheet-metal plate having thereon coatings of different materials, adapted, when united, to form a solder alloy.

2. A sheet-metal plate having its opposite surfaces coated with different materials, which, when united with heat form a solder.

3. A sheet-metal plate having one side coated with tin and the other side coated with a material adapted to form a solder alloy with tin.

4. A sheet-metal plate having its surface on one side coated with lead and the other coated with tin.

5. A sheet-metal plate having thereon coatings of different materials, adapted to form a solder alloy, whereby when the parts of such plate are brought together to form a seam and heated, solder is formed *in situ*.

In testimony whereof I affix my signature in presence of two witnesses.

GEORGE H. STEWART.

Witnesses:
 HENRY E. COOPER,
 EDWARD L. REED.